Patented June 4, 1940

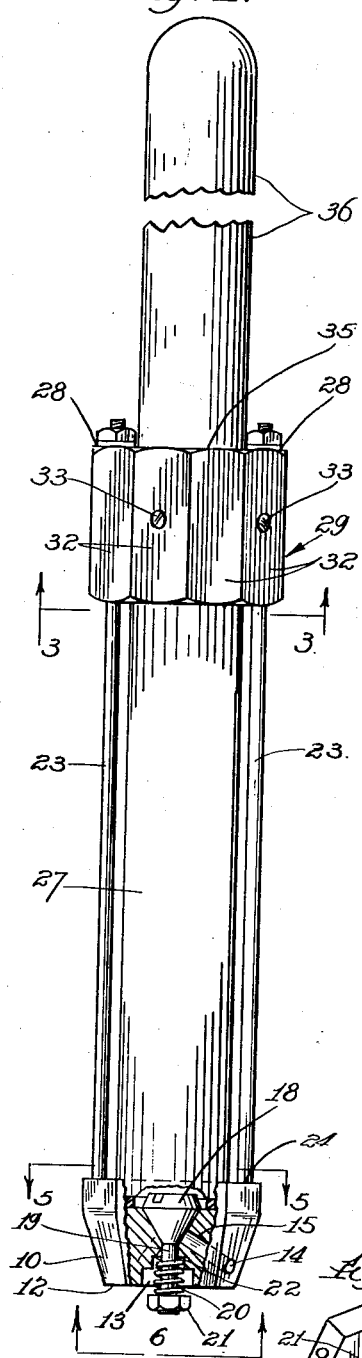
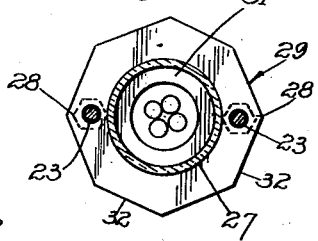
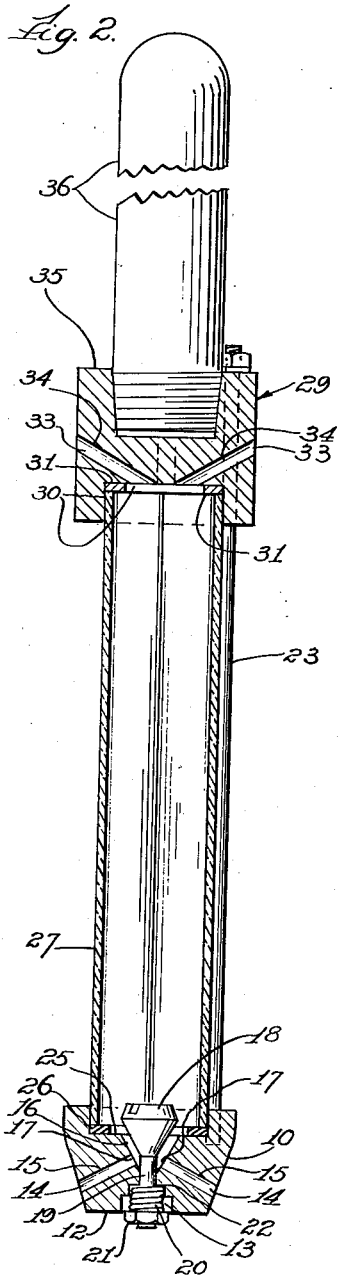
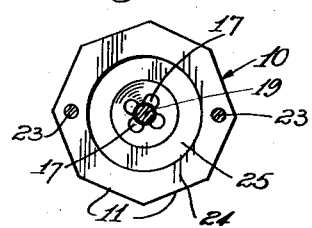
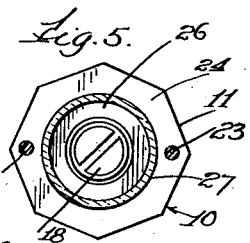
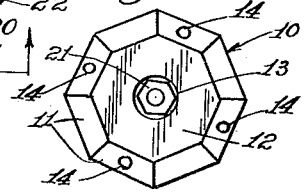

2,203,019

UNITED STATES PATENT OFFICE 2,203,019

GAUGE

Roy A. Johnson and Oscar F. Johnson, Chicago, Ill.

Application June 14, 1939, Serial No. 279,095

2 Claims. (Cl. 137—18)

Our invention relates to a gauge for determining whether or not there is water in a tank or container of gasoline.

In service stations where gasoline is sold for automobiles there are instances of water being found in the gasoline tanks. Customerse have at times complained that the gasoline sold them has contained water. Among the objects of our invention is to provide a gauge that may be inserted into a gasoline tank before the customer so that he may see for himself whether or not there is or is not any water in the gasoline. Our gauge may be used successfully because water is heavier than gasoline and sinks to the bottom of the tank. Whenever there is water in the tank our gauge will detect it. Our invention contemplates such other objects, advantages and capabilities as will later more fully appear and which are inherently possessed by our invention.

While we have shown in the accompanying drawing a preferred form of our invention yet we desire it understood that the same is susceptible of modification and change without departing from the spirit of our invention.

Referring to the drawing, Fig. 1 is an elevational view of our gauge with a portion broken away showing the valve in seated position; Fig. 2 is a longitudinal sectional view showing the valve in open position; Fig. 3 is a detail view on line 3—3 of Fig. 1; Fig. 4 is a detail view on line 5—5 of Fig. 1 with the valve removed and Fig. 5 with the valve in place; Fig. 6 is a bottom plan view of the head.

The embodiment selected to illustrate our invention comprises a bottom casting or head 10 having preferably eight sides 11 and curving slightly downwardly and upwardly to a flat bottom 12 having an aperture 13. Adjacent the lower portion of alternate sides 11 are openings 14 which lead diagonally upwardly and inwardly as channels 15 to hollowed out portion or valve seat 16 in the top portion of head 10. The upper openings 17 of channels 15 form a four-leaf clover design at the bottom portion of the seat 16 adjacent the upper end of aperture 13.

A valve head 18 is seated on valve seat 16 and valve stem 19 extends downwardly in aperture 13 beyond bottom 12. A spring 20 is positioned around the lower portion of stem 19 between nut 21 which is screwed to the lower end of valve stem 19 and ledge 22.

A pair of rods 23 have their lower ends attached by screw threads to opposite sides of the top portion 24 of head 10. The top portion 24 is hollowed out to form a seat 25 for a washer 26 on which rests the lower end of glass tube 27. The upper ends of rods 23 are attached by screw threads to opposite sides of the bottom portion 28 of cap 29. A recess 30 is provided in the bottom portion 28 of cap 29 to receive a washer 31 against which is positioned the upper end of glass tube 27. The cap 29 has preferably eight side portions 32 and centrally positioned in alternate side portions 32 are apertures 33 leading diagonally downwardly and inwardly as channels 34 to recess 30 so that their inner openings forming a four-leaf clover design communicating with the interior of the glass tube 27.

The upper portion 35 of the cap 29 is hollowed out and screw threaded to receive the screw threaded end of a handle 36.

In use let us assume that a customer asks whether there is any water in the gasoline at a certain service station. The attendant states that he will let the customer see for himself. The attendant takes our gauge, inserts it by the handle into the tank, places it on the bottom of the tank so as to press the valve stem upwardly. This moves the valve head away from the inlet openings and the liquid at the bottom of the tank enters the glass tube, replacing the air which leaves through the air vent openings in the cap. The gauge is lifted off the bottom of the tank, the valve closes and the gauge is removed from the tank. If there is any water in the tank it will be at the bottom of the tank and will be picked up by the gauge. If there is no water the customer can see for himself in the gauge that there is no water in the service station's gasoline and will go away completely satisfied.

The cap 29 is spaced from the head 10 so that when our gauge is inserted into the tank for use the openings 33 of the cap 29 are above the anticipated level of the water where they may receive the gasoline or other petroleum in the tank.

While we have indicated that our gauge is particularly useful for determining whether or not there is water in gasoline, yet our gauge is also adapted to be used in determining the amount of water, if any, in any petroleums lighter than water.

Having thus described our invention, we claim:

1. A gauge for determining whether there is any water in a given supply of gasoline in a tank, comprising a head, a cap, and a transparent tube extending between said head and said cap, said head having a recess in its upper portion, said cap having a recess in its lower portion, the lower end of said tube positioned in the recess in the upper portion of the head and the upper end of said tube positioned in the recess in the lower portion of said cap, said head having a plurality of downwardly and inwardly extending side portions, a flat bottom with an aperture leading upwardly through said head, a top portion having a seat, alternate side portions having therein liquid receiving channels leading diagonally upwardly and inwardly from the exterior of said side portions into said seat, a valve in said seat controlling the inner openings of said channels and having an actuating stem extending below said head, said cap having a plurality of side portions, and having therein air exit channels leading diagonally upwardly and outwardly through alternate side portions to the exterior thereof, and a handle removably attached to said cap.

2. A gauge for determining whether there is any water in a given supply of gasoline in a tank, comprising a head, a cap, and a transparent glass tube extending between said head and said cap, said head having an upper portion with a rim surrounding a recess, said cap having a lower portion with a rim surrounding a recess, the lower end of the tube positioned in the recess in the head and the upper end of the tube positioned in the recess in the cap, said head having a substantially centrally positioned valve chamber and a seat below said recess, a flat bottom with an aperture leading upwardly to said valve chamber, and a plurality of side portions extending downwardly and inwardly from said rim to said flat bottom, alternate side portions of said head having liquid receiving channels leading from their lower exteriors diagonally upwardly and inwardly through said side portions to said valve chamber, a valve having a head adapted to normally sit on said seat and close the inner openings of said channels, said valve having a stem extending downwardly in the aperture of the head and adapted upon receiving pressure to lift the valve head above the seat and permit the inner openings of the channels to have communication with the valve chamber and the tube, said cap having a plurality of side portions, and having air exit channels leading from the top of the tube, diagonally upwardly and outwardly through alternate side portions to the exterior thereof, a pair of spaced rods extending on opposite sides of said tube, the lower ends of said rods removably attached to the rim of the head and the upper ends of the rods removably attached to the rim of the cap, said cap having a recess in its upper portion, and a handle having one end adapted to fit within said recess for removable attachment of the handle to the cap.

ROY A. JOHNSON.
OSCAR F. JOHNSON.